B. FORD.
VENTILATION OF STORAGE BATTERY CELLS.
APPLICATION FILED FEB. 8, 1918.
1,289,146.
Patented Dec. 31, 1918.
3 SHEETS—SHEET 1.
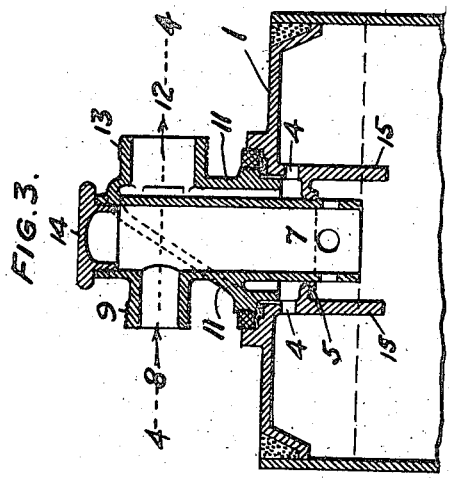
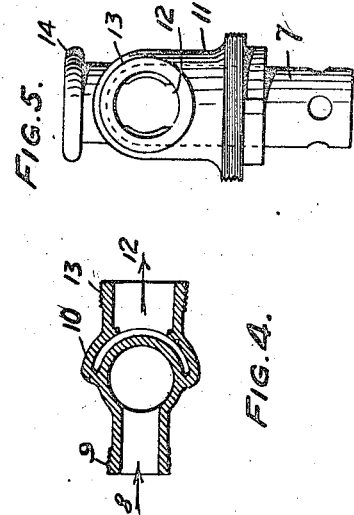
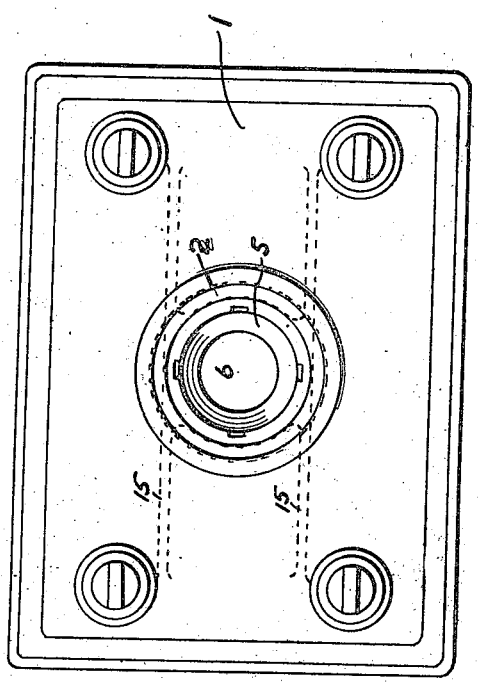
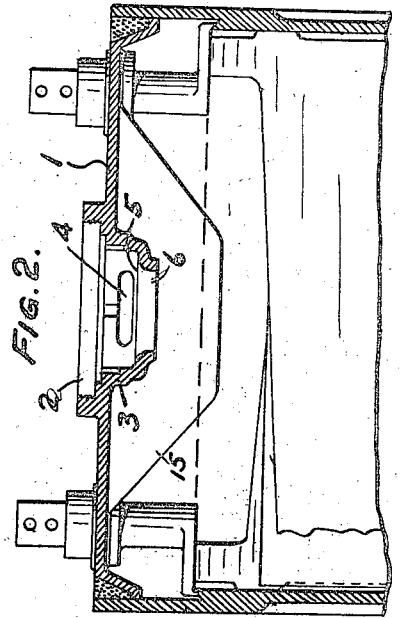
WITNESS:
INVENTOR
Bruce Ford
BY
Augustus B Stoughton
ATTORNEY.

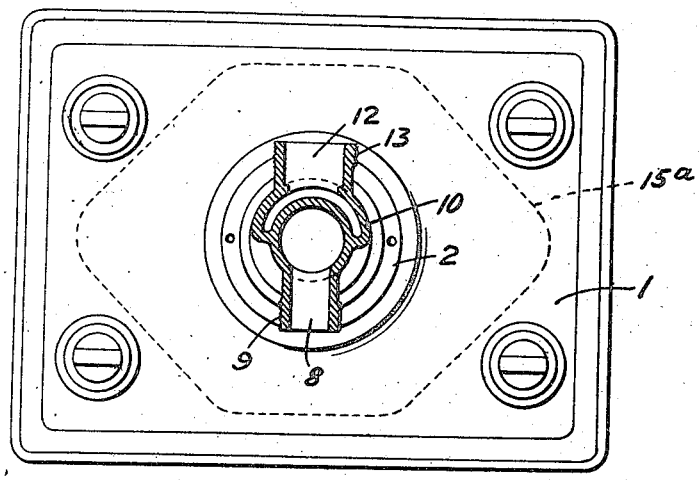
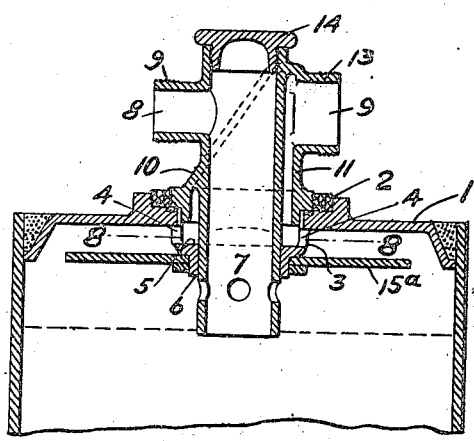
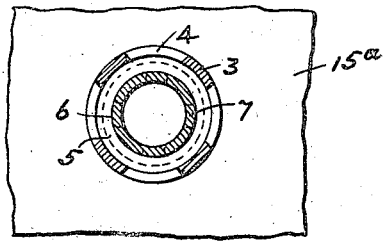

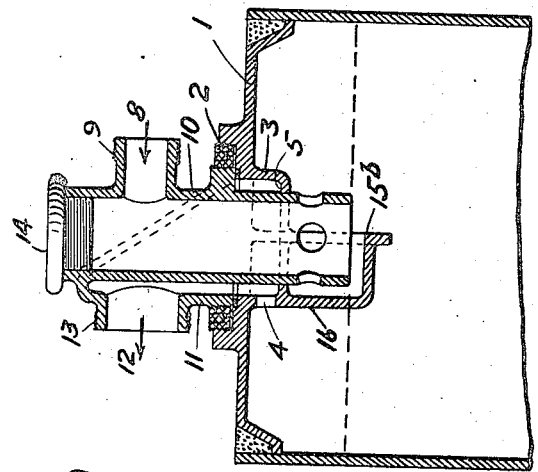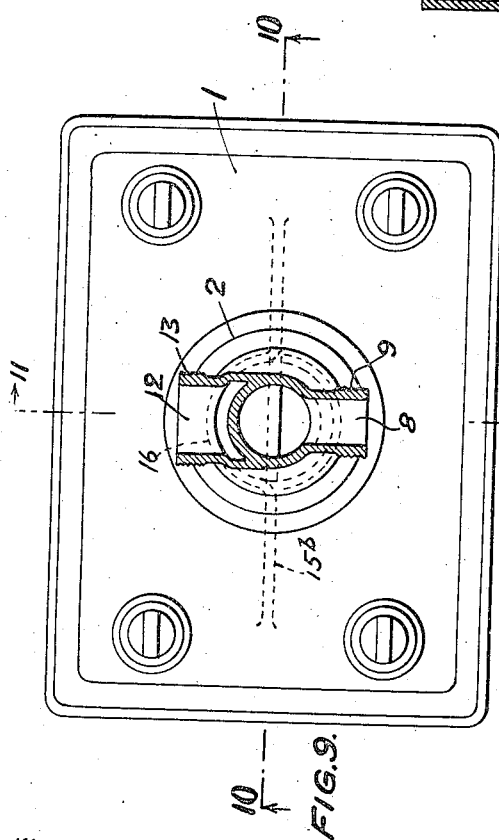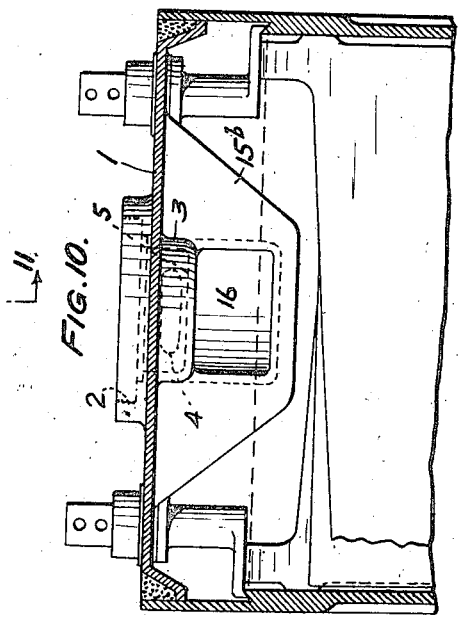

UNITED STATES PATENT OFFICE.

BRUCE FORD, OF PHILADELPHIA, PENNSYLVANIA.

VENTILATION OF STORAGE-BATTERY CELLS.

1,289,146.

Specification of Letters Patent.

Patented Dec. 31, 1918.

Application filed February 8, 1918. Serial No. 215,986.

*To all whom it may concern:*

Be it known that I, BRUCE FORD, a citizen of the United States, and a resident of Philadelphia, in the county of Philadelphia and State of Pennsylvania, have invented certain new and useful Improvements in the Ventilation of Storage-Battery Cells, of which the following is a specification.

The principal objects of the present invention are, first, to provide for insuring proper ventilation of storage battery cells, more particularly submarine cells; and second, to provide a comparatively inexpensive, reliable and easily manufactured fitting for the purpose above mentioned.

The invention will be claimed at the end hereof, but will be first described in connection with the embodiments of it chosen for the sake of illustration in the accompanying drawings forming part hereof and in which—

Figure 1, is a top view of a cover embodying features of the invention.

Fig. 2, is a transverse sectional view of the same.

Fig. 3, is a sectional view of the cover shown in Figs. 1 and 2, with the filling and ventilation fitting in place.

Fig. 4, is a section on the line 4—4 of Fig. 3.

Fig. 5, is a side view of the fitting detached from the cover.

Fig. 6, is a top view of a cover showing the fitting in section and illustrating the application of the invention to a different arrangement of accessory parts.

Fig. 7, is a vertical elevation of the device shown in Fig. 6.

Fig. 8 is a section on the line 8—8 of Fig. 7.

Fig. 9, is a view, similar to Fig. 6, illustrating the application of the invention to a different arrangement of accessory parts.

Fig. 10, is a section on the line 10—10 of Fig. 9, looking in the direction of the arrows, and Fig. 11, is a section on the line 11—11 of Fig. 9.

In the drawing the cover 1 is provided with a relatively large opening 2. A neck 3, depends from or is arranged beneath the underface of the cover and this neck is provided with ports 4 and with a floor 5 having a second and similar opening 6. The fitting is provided with an inner tube 7 closing the opening 6 and communicating below the floor 5 with the space beneath the cover. This inner tube 7 is provided with a lateral opening 8 which may be formed through a coupling 9. The fitting also comprises a shell 10, in the form of an outer tube 11, closing the larger opening 2 and communicating with the ports 4 and extending laterally to clear the opening 8, and terminating in a second lateral opening 12 that may be provided with a coupling 13. The fitting, with the exception of the filling cap 14, comprises a unitary structure and can be comparatively inexpensively and cheaply manufactured. The openings 2 and 6 are concentric and spaced at different levels and the open ends of the inner and outer tubes 7 and 11 of the fitting close these openings 6 and 2, and the inner and outer tubes are not in communication with each other save as they both communicate with the space beneath the cover.

I have shown in the drawings, baffle-plates but they are not claimed herein since the combination of baffle-plates with air intakes and out-takes, arranged to produce ventilation, constitutes the subject-matter of my application serially numbered 215,985; however, I may say that in Figs. 1 to 3, the baffle-plates 15 depend vertically and merge into the neck 3. As shown in Figs. 6 and 7 the baffle-plate 15ª is arranged parallel with the cover and projects downward from the neck 3. As shown in Figs. 9 to 11, the baffle-plate 15ᵇ is provided with a swell or bulge 16 into which depends the end of the inner tube, and the baffle-plate is in line with the axis of the inner tube. In those figures the neck 3 is not provided with ports on the side thereof opposite the swell or bulge 16.

What I claim is:

1. Improvements in ventilating storage battery cells comprising the combination of a cover having relatively large and relatively small concentric openings, and a fitting provided with non-communicating inner and outer ventilating tubes of which one closes the larger opening and the other closes the smaller opening and of which both communicate with the space beneath the cover.

2. Improvements in ventilating storage battery cells comprising the combination of a cover having a relatively large opening, a floor having a smaller opening and arranged below and spaced from the under face of the cover, a neck having ports and carrying the floor, and a fitting provided with non-communicating inner and outer ventilating tubes of which one closes the larger opening and communicates with the ports and of which the other closes the smaller opening and communicates with the space beneath the floor.

3. Improvements in ventilating storage battery cells comprising the combination of a cover having a comparatively large opening, a neck having ports and depending from the cover and having a floor provided with a second and smaller opening, and a fitting for the openings provided with an inner tube venting below the floor and having an outside opening and also provided with a shell closing the larger hole and communicating with said ports and extending laterally to clear said outside opening and terminating in a second opening.

4. Improvements in ventilating storage battery cells comprising the combination of a cover having a large opening and a second and smaller opening, and a fitting for the openings provided with an inner ventilation tube closing the smaller opening and communicating with the space between the cover and having an outside opening, and also provided with a shell closing the larger opening and communicating with the space between the cover and extending laterally to clear said outside opening and terminating in a second opening.

BRUCE FORD.